Figure 11:
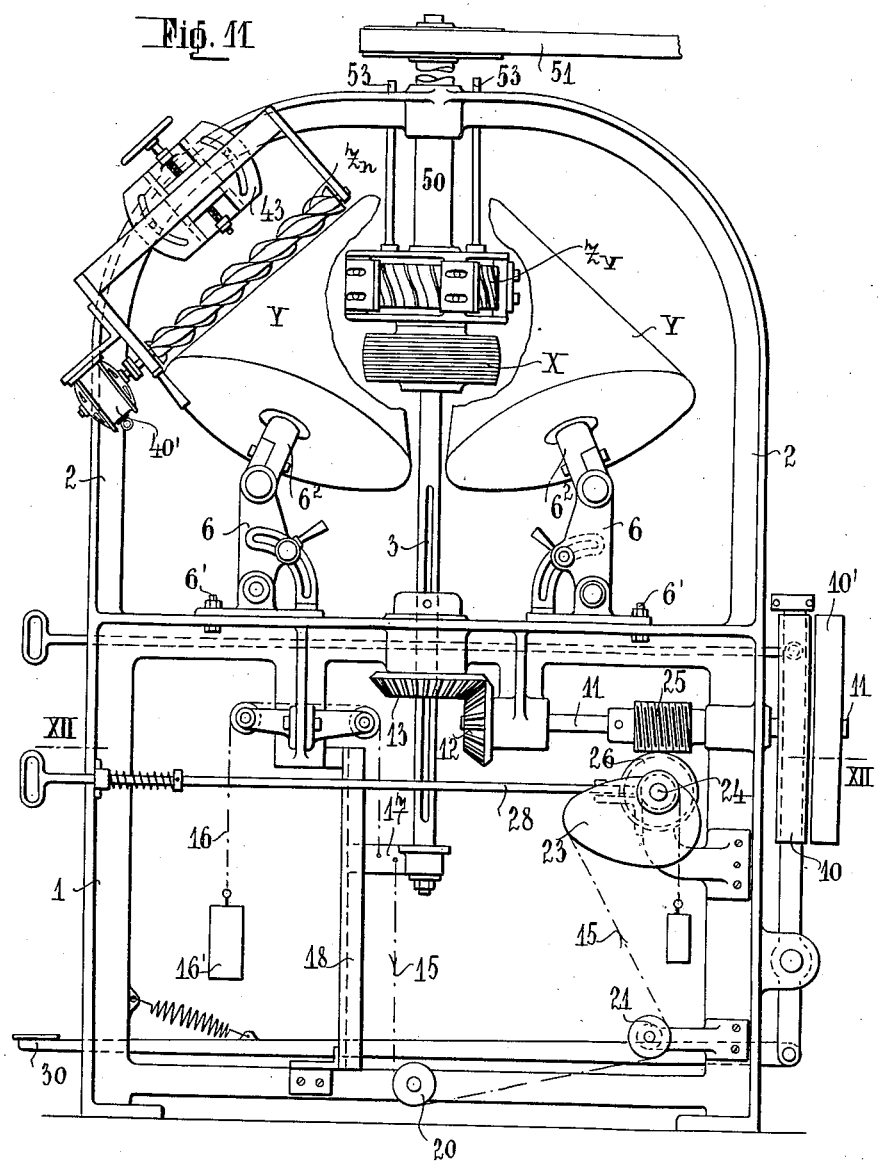

J. KOLB.
MACHINE FOR FINISHING HAT BODIES.
APPLICATION FILED DEC. 12, 1913.
1,096,111. Patented May 12, 1914.
4 SHEETS—SHEET 1.
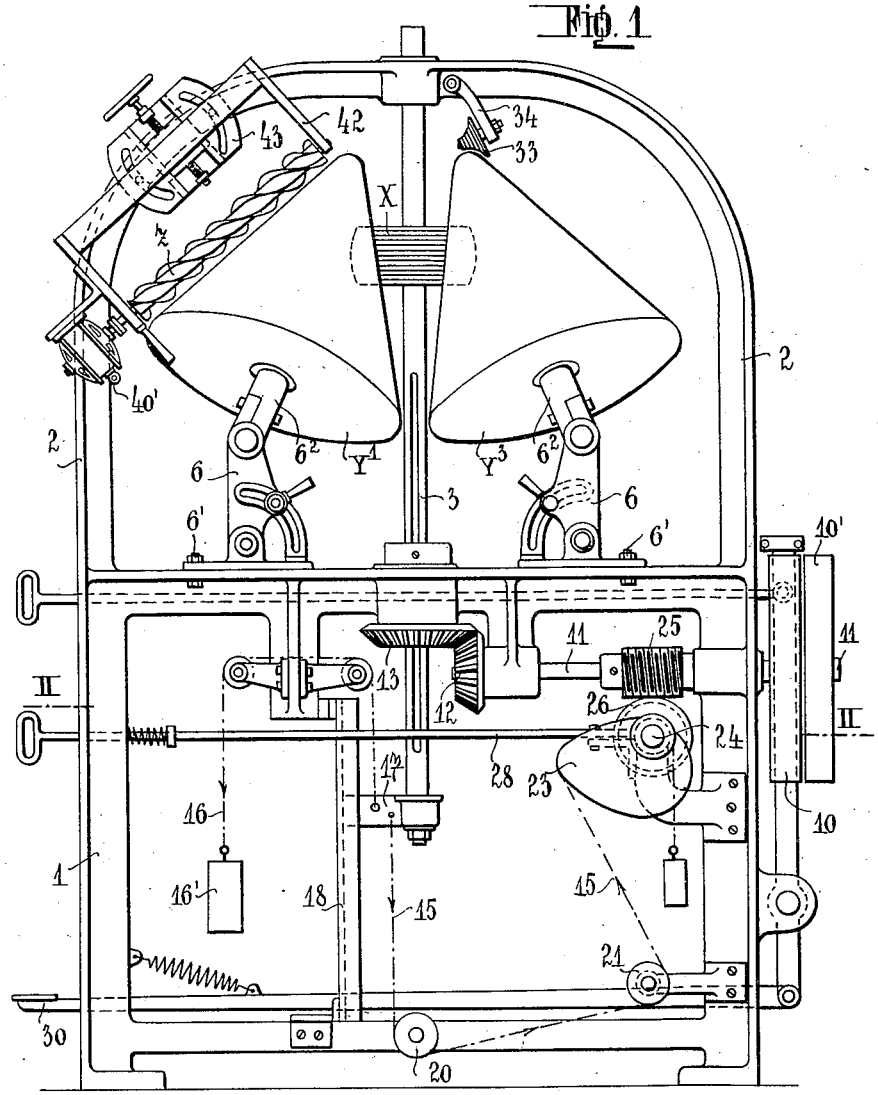
Fig. 1
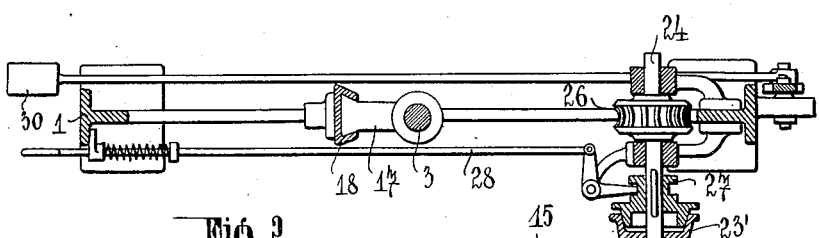
Fig. 2
Attest:
R. Richardson
Eugene Wening
Inventor:
Josef Kolb
by ........ Atty.

J. KOLB.
MACHINE FOR FINISHING HAT BODIES.
APPLICATION FILED DEC. 12, 1913.
1,096,111.
Patented May 12, 1914.
4 SHEETS—SHEET 2.
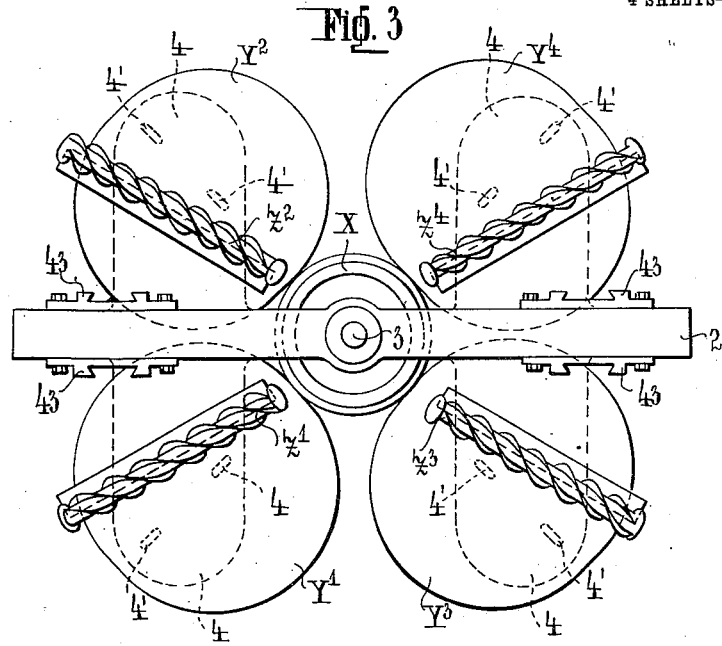
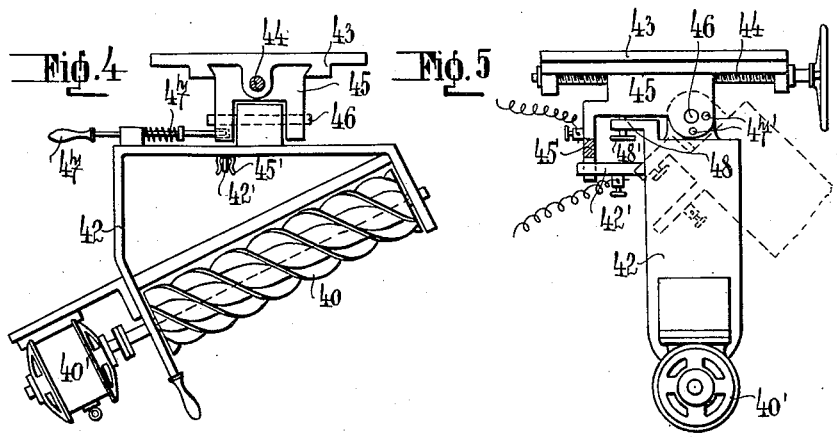
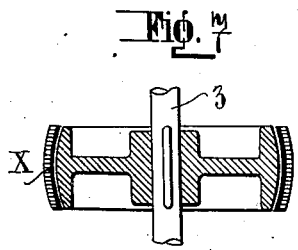
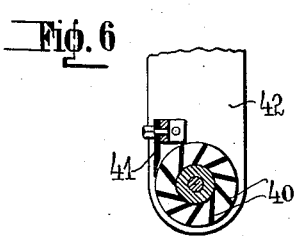
Attest:
R. Richardson
Eugene Wining
Inventor:
Josef Kolb
by
Atty.

J. KOLB.
MACHINE FOR FINISHING HAT BODIES.
APPLICATION FILED DEC. 12, 1913.
1,096,111.
Patented May 12, 1914.
4 SHEETS—SHEET 3.
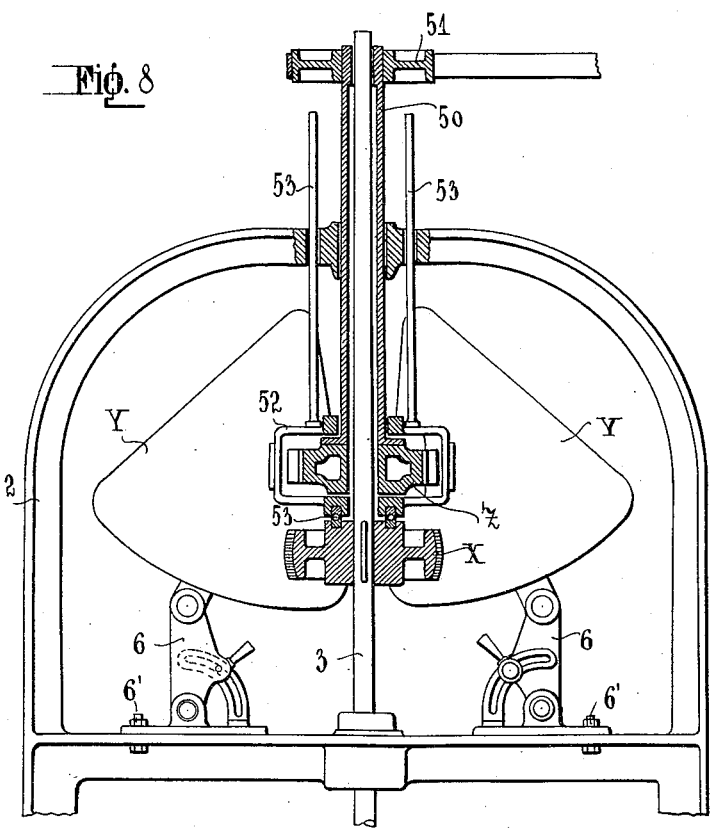
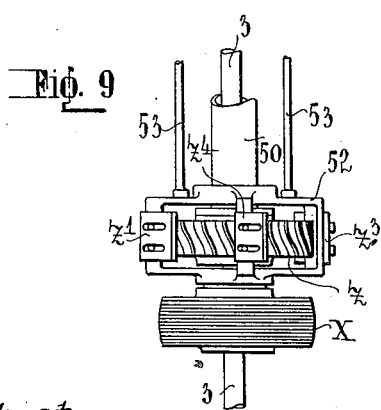
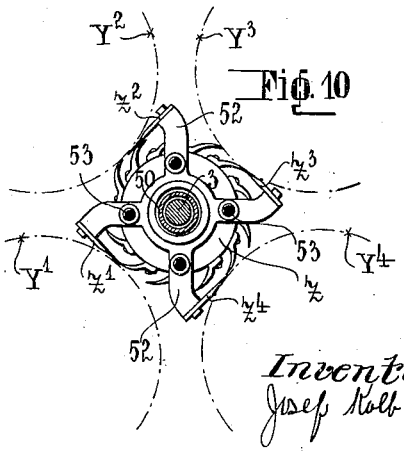
Attest:
R. Richardson
Eugene Wining
Inventor:
Josef Kolb
by
Atty.

J. KOLB.
MACHINE FOR FINISHING HAT BODIES.
APPLICATION FILED DEC. 12, 1913.

1,096,111.

Patented May 12, 1914.
4 SHEETS—SHEET 4.

Attest
R. Richardson
Eugene Wening

Inventor:
Josef Kolb
by
Atty.

UNITED STATES PATENT OFFICE.

JOSEF KOLB, OF NEUTITSCHEIN, AUSTRIA-HUNGARY.

MACHINE FOR FINISHING HAT-BODIES.

1,096,111.  Specification of Letters Patent.  Patented May 12, 1914.

Application filed December 12, 1913. Serial No. 806,287.

*To all whom it may concern:*

Be it known that I, JOSEF KOLB, a subject of the Emperor of Austria-Hungary, residing at Neutitschein, Moravia, Austria-Hungary, have invented certain new and useful Improvements in Machines for Finishing Hat-Bodies, of which the following is a specification.

The present invention relates to a machine for finishing hat bodies of any kind, more especially bodies made of velvet.

The object of the invention is to provide a machine in which the operations of raising the nap and cutting or shearing may be performed in a continuous manner, that is, without removing the body or bodies from the blocks.

Hitherto it has been usual to nap the hat body after placing same upon a suitable cone or block in a separate napping or raising machine and to subject the body in a second machine to the shearing or cutting operation. It was, therefore, necessary to remove the hat body after the napping operation from the cone of the napping machine and to place the same upon the cone of the shearing machine. In removing the napped or raised hat body it is impossible even when the greatest care is used to avoid pressing down the raised nap in some places, and it was, therefore, usual before commencing the shearing operation to raise the nap by means of hand brushes or cards which of course involves additional work.

In order to avoid the drawbacks of the present method of carrying out the two operations on two separate machines, the machine for working the hat bodies is provided according to the present invention, with means for raising the nap and also with means for shearing or cutting the nap in such a manner that the shearing or cutting may be performed either immediately after the raising or simultaneously with the raising without removing the hat body from the cone. Any desired devices for raising the nap and for shearing or cutting may be used in a machine embodying the features of the present invention. The machine may be arranged for working either one body or for working several bodies simultaneously.

In the accompanying drawings are illustrated machines for simultaneously raising and shearing several bodies.

Figure 12:
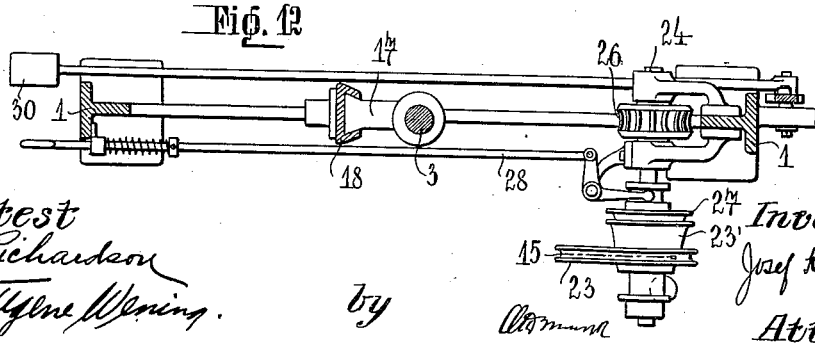

Figure 1 is a front elevation of a machine for finishing hat bodies in which the shearing operation is accomplished immediately after the raising operation has been completed, Fig. 2 is a horizontal section on line II—II of Fig. 1, Fig. 3 is a plan showing the relative arrangement of the raising and shearing tools, Figs. 4 to 7 show details of the shearing and raising devices. Fig. 8 shows in elevation a machine for simultaneously performing the raising and shearing operation, Figs. 9 and 10 illustrate details of the machine shown in Fig. 8. Fig. 11 shows in front elevation a machine for simultaneously performing the preliminary shearing and raising of the nap and also for carrying out the final shearing or cutting, Fig. 12 is a horizontal section on line XII—XII of Fig. 11.

In the construction shown in Figs. 1 to 7, the machine comprises a rectangular underframe 1, in which the gear for driving the raising tool $x$ is mounted. In the construction shown in the drawing, the raising tool consists of a simple disk upon which is removably fixed a card band. Upon the underframe 1 of the machine is mounted a yoke-shaped upper frame 2 in which are mounted the shearing or cutting tools $z$. Upon the underframe 1 are arranged symmetrically with regard to the shaft 3 of the raising tool 2 base plates 4 upon each of which are mounted two blocks or cones $y^1$, $y^2$, and $y^3$, $y^4$ for raising the hat bodies to be treated (Fig. 3). Each of the cones or blocks is carried by a standard 6 which is adjustably mounted in elongated holes $4^1$ of the base plate 4 and may be fixed in position by means of bolts $6^1$. Each standard 6 comprises several parts hinged together, of which the part $6^2$ contains a bearing in which the block or cone is adapted to rotate.

By means of the above described arrangement the cones or blocks may be adjusted in such a manner as to cause the raising or napping tool $x$ to work simultaneously upon the hat bodies arranged symmetrically around the same. The raising or napping tool is adapted to perform a rotary movement and may receive simultaneously an up and down movement by means of a driving gear to be presently described. The rotary movement of the raising or napping tool is derived from the main shaft 11 driven by a pulley 10, by means of bevel gears 12, 13. The up and down movement of the raising tool is effected by two cords or chains 15, 16 which are secured to a slide 17 guided in a suitable way 18. The slide 17 carries the lower bearing of the shaft 3. The cord or chain 15 is passed over suitable guiding rollers 20, 21 and is fixed at its other end to a cam disk 23. The cam disk 23 is loosely mounted upon a shaft 24 which is driven from the shaft 11 by means of a worm and screw 25, 26. The hub $23^1$ of the cam disk is made in the form of one part of a clutch or coupling, the other part 27 of the coupling being longitudinally movable upon the shaft 24. The clutch part 27 may be shifted by means of a manually operated rod 28. When the cord 15 is operated in the direction of the arrow by the rotation of the cam disk 23, the shaft 3 is lowered and the raising tool $x$ is also lowered, the tool being at the same time rotated. The upward movement of the shaft 3 and the raising tool $x$ is effected by the counter-weight $16^1$ and the cord 16.

The operation is as follows: The cones are suitably adjusted, the clutch $23^1$, 27 is thrown out and the raising tool $x$ is raised to its highest position. In this position of the parts, the belt is placed upon the driving pulley 10 and the shaft 11 is rotated whereby the raising tool $x$ is given a rotary movement. During this stage of the operation, the bodies are raised or napped in the proximity of their apices. The clutch $23^1$, 27 is now thrown in, whereby the cam disk 23 is rotated so as to pull the cord 15 and to lower the shaft 3 together with the raising or napping tool $x$, the tool continuing its rotation during the downward movement. By the movement of the raising or napping tool $x$ all cones $y^1$—$y^4$ are simultaneously rotated and the bodies placed upon the cones are very effectively napped upon their whole circumferences. When the napping tool reaches its lowest position, the napping operation is completed. The treadle 30 is now depressed to shift the driving belt of the machine on to the loose-pulley $10^1$, and the clutch $23^1$, 27 is thrown out. The shaft 3 together with the raising tool is then raised to its initial position by the counter-weight $16^1$. The return movement of the cam disk 23 is at the same time obtained by a suitable counter-weight.

For finishing the apices of the bodies, there is provided a roller 33 which is mounted upon a pivot lever 34. This lever may be lifted from the body and fixed by any suitable means in its inoperative position. The shape of the cam disk is so chosen that the speed of the longitudinal movement of the raising tool is gradually reduced, while the tool progresses toward the basis of the bodies. The object of this arrangement is to obtain a uniform working upon all the parts of the bodies.

As mentioned above, the machine is provided with means for cutting or shearing the nap immediately after the completion of the raising operation. For this purpose there is provided for each cone $y^1$—$y^4$ a corresponding shearing or cutting device $z^1$—$z^4$. The shearing or cutting devices may be held in an inoperative position during the raising operation and may be moved into the operative position either manually or by an automatic device after the completion of the raising operation.

In the construction shown in Figs. 1 to 3, each shearing device consists as usual of a spiral cutter 40 coöperating with a corresponding ledge knife or blade 41 (Figs. 4 and 6). The spiral cutter 40 is driven in well-known manner directly by an electro motor $40^1$. The axis of the spiral cutters 40 are arranged at an acute angle with regard to the axis of the raising tool. Each spiral cutter is mounted in such a manner that it may be placed in a position parallel to a generatrix of the cone upon which the body is fitted. The spiral cutter and the blade coöperating therewith are mounted in a frame 42 which is carried by a bracket 43 adjustably mounted upon the upper frame 2 of the machine. For this purpose the holder or frame 42 is pivotally mounted at 46 upon a slide 45 which may be shifted by means of a screw 44 in a suitable way of a bracket 43. The frame or holder 42 is provided with a spring catch 47 (Fig. 4) which is adapted to engage into one of two locking holes $47^1$ formed upon the slide 45 (Fig. 5). By means of an actuating device (47, $47^1$) the frame or holder 42 together with its shearing device may be locked in the idle position, that is in the position in which the device is lifted from the cone. On releasing the catch 47, the shearing device swings downwardly into the operative position, the latter being determined by a stop 48 of the frame 42 coming into contact with the slide 45 (Fig. 5).

The fine adjustment of the spiral cutter with regard to the cone may if necessary be obtained by means of a set screw $48^1$ mounted upon the stop 48 or by providing an adjustable stop upon the slide, or by any other suitable means. The driving motor $40^1$ which rotates the spiral cutter may be switched in manually or automatically. The automatic switching in of the motor $40^1$ may be easily obtained by providing a switch which is closed automatically when the shearing device swings into the operative position and is opened when the shearing device is lifted into the idle position. A switch of this kind may for instance consist of a contact $45^1$ mounted upon the slide 45 and coöperating with a second contact $42^1$ fixed upon the frame 42 (Fig. 5).

It will be easily understood that by means of the improved machine a considerable saving of time and labor may be effected, owing to the fact that the shearing operation of the body may be carried out immediately after the completion of the raising operation without necessitating the removal of the body from the block or cone. A machine embodying the main features of the invention may also be constructed in such a manner as to enable the shearing or cutting operation and the raising operation to be performed simultaneously. One construction of such a machine is shown in Figs. 8 to 10 by way of example. The general arrangement of parts is substantially the same as in the construction previously described. The raising tool $x$ which in this construction is arranged upon a centrally located shaft 3, receives as in the previous case a rotary motion and a simultaneous up-and-down movement. Upon the shaft 3 is loosely mounted a hollow shaft 50 which at its lower end carries a drum $z$ upon which the shearing or cutting knives are mounted. Upon the upper end of the hollow shaft 50 is mounted a pulley or other driving organ by means of which the cutter drum $z$ may be rotated. The ledge blades or knives $z^1$—$z^4$ coöperating with the cutter drum are mounted upon a cross 52 (Fig. 10) which may if desired be supported by the hub of the raising tool $x$ by means of a ball bearing 53. The frame or cross carrying the counter knives $z^1$—$z^4$ is suspended from rods 53 which are vertically guided in the upper frame 2 of the machine as shown in Fig. 8. In the construction shown there are four counter-knives each mounted upon a corresponding arm of the cross 52. It is obvious, however, that the number of the counter-knives or blades depends upon the number of the bodies dealt with and may be either reduced or increased according to requirements.

The operation of the machine shown in Figs. 8 to 10 is as follows: At the beginning of the operation the raising tool $x$ is in its topmost position. The shaft 3 of the raising tool is now coupled with the driving gear in such a manner as to impart to the raising tool a rotary motion and at the same time an axial downward movement. If the cones have been properly adjusted with regard to the raising tool, the bodies are first raised or napped in the proximity of their apices. During the downward movement of the raising tool, the shearing device $z$ follows the raising tool so that the raised portions of the bodies are cut or sheared immediately after the raising operation. The ratio of speeds of the raising disk $x$ and the driving gears of these two tools being entirely independent in spite of the simultaneous longitudinal movement of the tools.

It may be pointed out that the invention is applicable to machines in which only one body is treated, as the main advantages of performing the shearing operation simultaneously or immediately after the napping operation, may be realized even if only one body is dealt with. The improved machine is, however, particularly suitable for simultaneously finishing a number of bodies. The shearing or cutting devices may be constructed in such a manner that the cutting drum forms the rotating part of an electro motor. In some cases it might be advisable to provide special controlling means by the aid of which the driving gear of the shearing device is thrown into action only after the raising tool has performed part of its function, that is, has been moved a certain distance in the downward direction.

In the construction shown in Figs. 11 and 12, the principle underlying the two constructions previously described has been retained, the shearing and napping operations being performed without removing the body from the block. The machine is provided with two independent shearing or cutting devices adapted to be brought into action at different times. The shearing device $z_v$ serves for the preliminary cutting or shearing while the shearing device $z_n$ accomplishes the final shearing. As will be seen from the drawing the shearing device $z_v$ is mounted upon the spindle 3 of the raising tool in the same manner as in the construction shown in Figs. 9 and 10. In addition to the preliminary shearing device there are provided upon the upper frame 2 of the machine shearing devices $z_n$ of the kind shown and previously described with reference to Figs. 4 and 5. When the operation is started, the devices for the final shearing are moved into their idle positions, that is, they are lifted from the cones. The raising tool $x$ and the device for the preliminary shearing $z_v$ are first put into action. The bodies are raised, and at the same time cut. When this operation is completed, the devices $z_n$ for the final shearing are brought into action either manually or by means of suitable actuating devices and the bodies are subjected to the final cutting operation either along their whole surface or at certain points which require further treatment.

Having thus described my invention and explained the mode of operation thereof I claim and desire to secure by Letters Patent:

1. In a machine for finishing hat bodies, a frame; means arranged upon said frame for bearing the hat body; napping and shearing tools acting upon said hat body and driving means for said napping and shearing tools permitting the napping and shearing operation of the hat body in continuous manner without removal of its bearing means.

2. In a machine for finishing hat bodies, a frame; means arranged upon said frame for bearing the hat body; napping and shearing tools acting upon said hat body;

driving means for said napping and shearing tools and means for holding the shearing tools in inoperative position during the operation of the napping tools, so that the shearing operation may be performed after the completion of the napping operation without removal from the bearing means.

3. In a machine for finishing hat bodies, a frame; means arranged upon said frame for bearing the hat body; napping and shearing tools acting upon said hat body; driving means for said napping and shearing tools and means whereby said napping and shearing tools are rendered simultaneously operative.

4. A machine for finishing hat bodies comprising means for bearing the hat body in stretched position; a napping tool acting upon said hat body; two shearing tools; driving means for said napping and shearing tools; one of said shearing tools serving for the preliminary shearing of the hat body and coming into operation simultaneously with the napping tool, while the other shearing tool, serving for the final shearing, is adapted to work upon the napped and sheared hat body after the completion of the napping and preliminary shearing operation.

5. In a machine for finishing hat bodies, a frame; means arranged upon said frame for bearing the hat body; napping and shearing tools acting upon said hat body; driving means for said napping and shearing tools, means for holding the shearing tools in inoperative position during the operation of the napping tool and means for throwing in automatically the shearing tool when said shearing tool is moved into the operative position.

6. In a machine for finishing hat bodies, a frame; means arranged upon said frame for bearing the hat body; napping and shearing tools acting upon said hat body; driving means for said napping and shearing tools, and means for moving the shearing tool in the same direction as the napping tool, so that the napping operation is immediately followed by the shearing operation.

7. In a machine for finishing hat bodies, a frame; means arranged upon said frame for bearing the hat body; napping and shearing tools acting upon said hat body; driving means for said napping and shearing tools, the driving means of the shearing tools being arranged in such a manner, as to enable a rotary and an axial movement of the shearing tools.

8. In a machine for finishing hat body; a frame; means arranged upon said frame for bearing the hat body; napping and shearing tools acting upon said hat body; driving means for said napping and shearing tools; said shearing means consisting of a rotating cutter and counterknives, acting against said cutter.

9. In a machine for finishing hat bodies, a frame; means arranged upon said frame for bearing the hat body; napping and shearing tools acting upon said hat body; driving means for said napping and shearing tools, the driving mechanisms for said napping tools including means, enabling a rotary movement and simultaneously an up and down movement of the napping tool.

10. In a machine for finishing hat bodies, a frame; means arranged upon said frame for bearing the hat body; napping and shearing tools acting upon said hat bodies; driving devices for said napping and shearing tools, the driving device for the napping tool consisting of a cam disk, means operated by said cam disk for effecting the axial feeding movement of the napping tool in one direction; a counter weight acting upon said napping tool for effecting the return movement of the napping tool in the opposite direction.

11. In a machine for finishing hat bodies, a frame; a single napping tool; bearing means for a group of hat bodies said shearing means being arranged symmetrically to said napping tool, a group of spiral cutters each of these cutters acting upon a single hat body, said cutters being arranged at an angle to the axis of the central napping tool.

12. In a machine for finishing hat bodies, a frame; means arranged upon said frame for bearing the hat bodies, a single napping tool; driving means for said napping tool enabling a rotary and an axial movement of said napping tool; a single shearing tool; driving means for said shearing tool acting independently of the driving means for the napping tool.

13. In a machine for finishing hat bodies, a frame; means arranged upon said frame for bearing the hat bodies; napping and shearing tools acting upon said hat bodies, said napping tool consisting of a card band mounted exchangeably upon a disk.

In testimony whereof I affix my signature in presence of two witnesses.

JOSEF KOLB.

Witnesses:
ANTON MARCKE,
AUGUST FUGGER.